United States Patent [19]

Persson

[11] 4,322,646
[45] Mar. 30, 1982

[54] FLUX FOCUSSED DC MOTOR AND METHOD FOR ASSEMBLY

[75] Inventor: Erland K. Persson, Minneapolis, Minn.

[73] Assignee: Electro-Craft Corporation, Hopkins, Minn.

[21] Appl. No.: 126,028

[22] Filed: Feb. 29, 1980

[51] Int. Cl.³ .............................................. H02K 5/18
[52] U.S. Cl. ...................................... 310/64; 310/61; 310/154; 310/218; 165/104.26
[58] Field of Search ...................... 310/52, 53, 54, 55, 310/56, 57, 58, 59, 60 R, 64, 65, 40 MM, 218, 254, 258, 91, 214, 152, 154; 165/105

[56] References Cited

U.S. PATENT DOCUMENTS

| | | |
|---|---|---|
| 1,700,840 | 2/1929 | Gay ........................................ 310/52 |
| 1,739,137 | 12/1929 | Gay ........................................ 310/52 |
| 3,564,705 | 12/1967 | Cochardt ............................. 310/154 |
| 3,715,610 | 2/1973 | Brinkman ............................... 310/54 |
| 3,836,801 | 9/1974 | Yamashita ........................... 310/154 |
| 3,862,445 | 1/1975 | Volkrodt ............................. 310/154 |
| 3,988,623 | 10/1976 | Yamashita ..................... 310/40 MM |
| 4,012,651 | 3/1977 | Burson ................................ 310/153 |

FOREIGN PATENT DOCUMENTS 2003568  8/1971  Fed. Rep. of Germany ...... 310/154

Primary Examiner—R. Skudy
Attorney, Agent, or Firm—Schroeder, Siegfried, Vidas, Steffey & Arrett

[57] ABSTRACT

A DC motor utilizing flux focussing pole pieces and non-ferrous spacers to wedge the pole pieces and magnets into contact with the motor housing. Cooling is provided with heat pipes mounted in the spacers or pole pieces and/or the motor armature.

6 Claims, 7 Drawing Figures

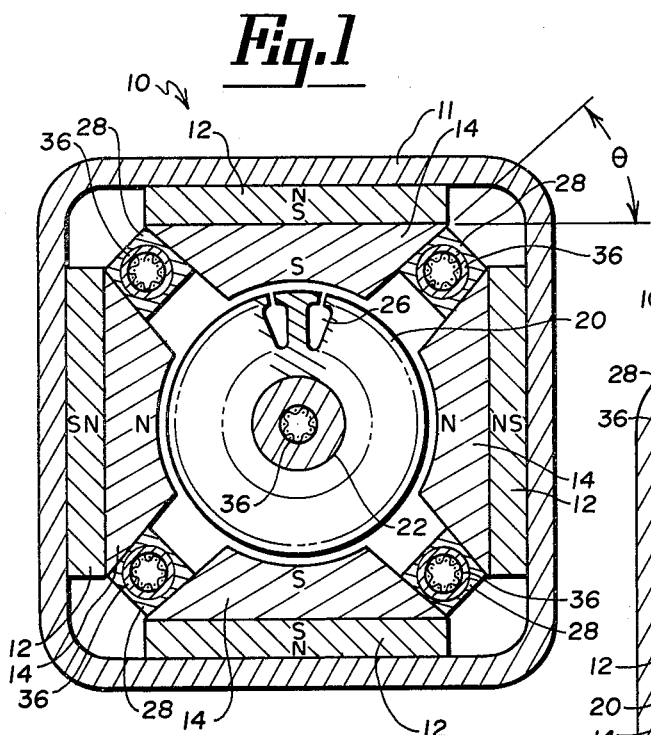
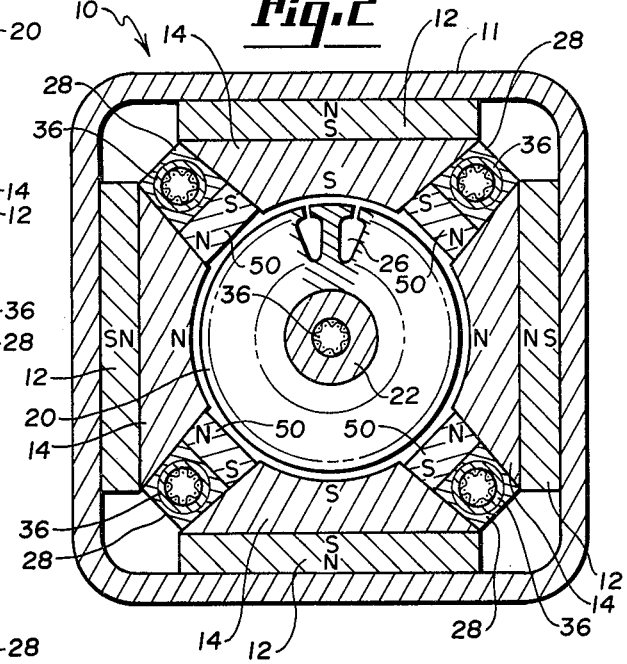
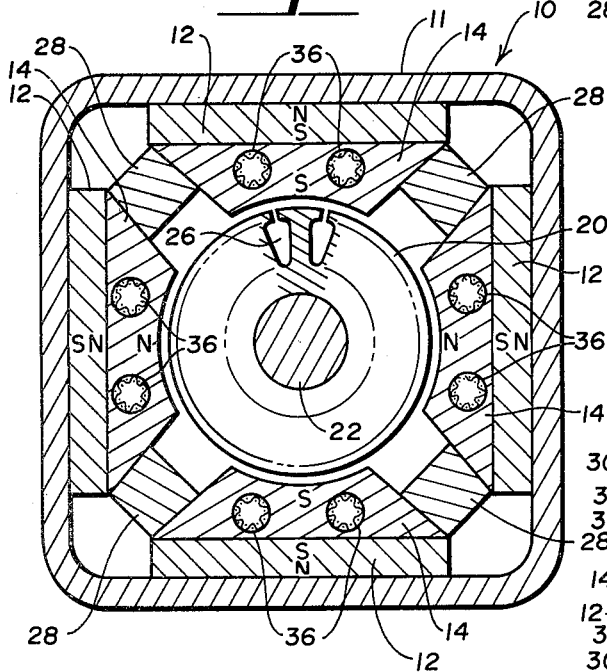
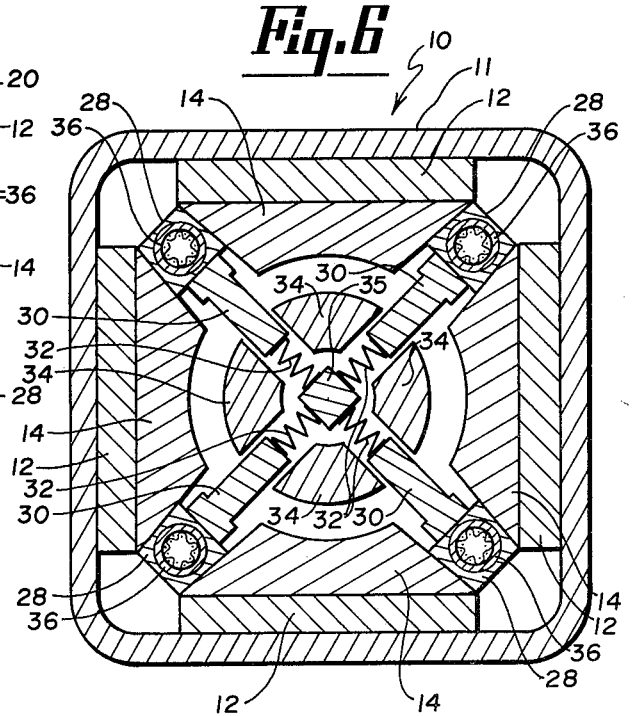

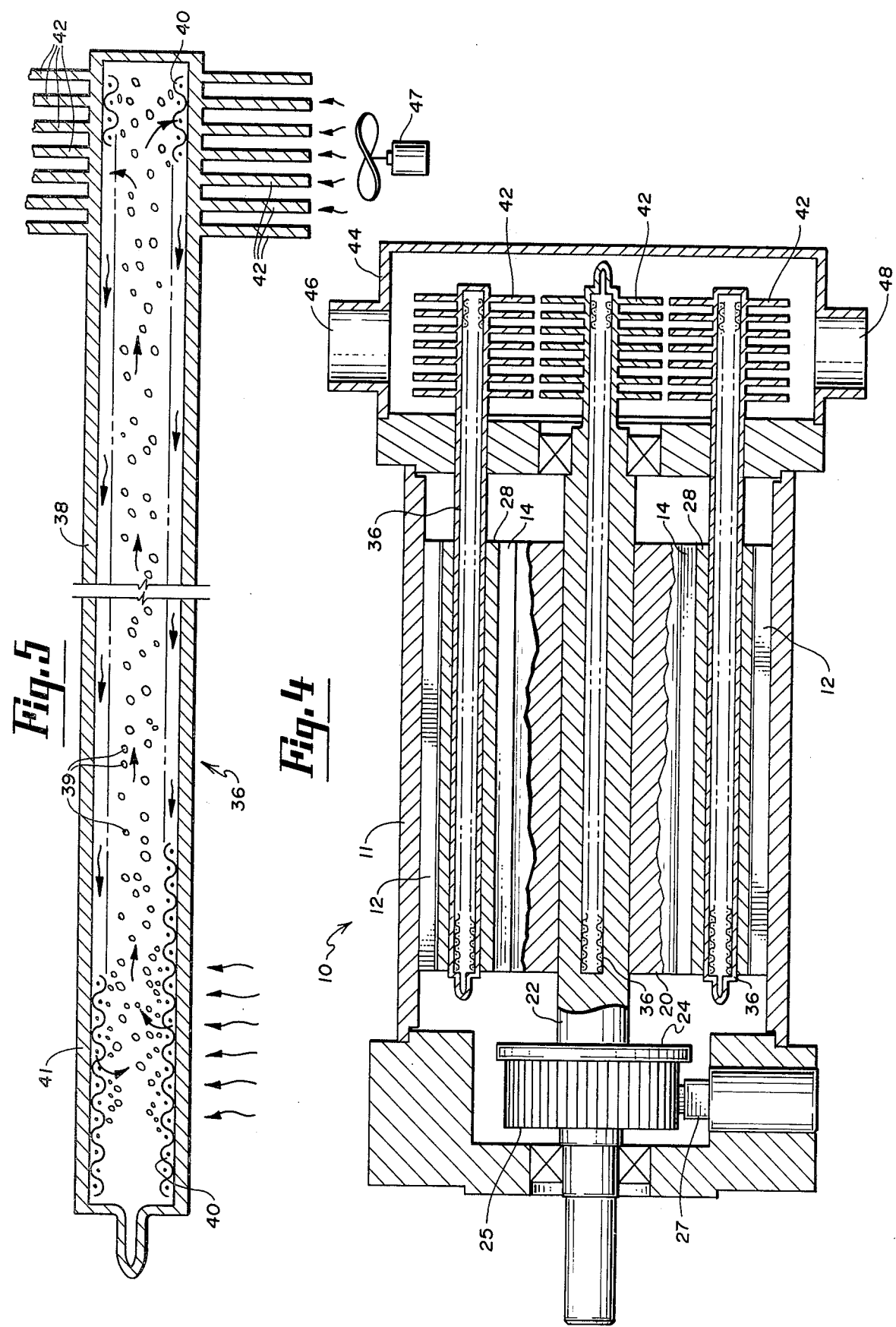

FLUX FOCUSSED DC MOTOR AND METHOD FOR ASSEMBLY

BRIEF DESCRIPTION OF THE INVENTION

This invention relates to DC motors. DC motors function as energy conversion devices producing mechanical energy from electrical energy.

The main limitation on the output capacity of a DC motor is the internal heat generation within the motor due to the various machine losses. The most significant of these losses is the copper loss, which is also referred to as the $I^2R$ loss of the armature. One of the most challenging problems to be faced in the design of modern high-performance DC motors is the removal of the heat due to the copper loss from the armature.

In many cases, the use of forced air cooling as suggested by the prior art is not practical. The use of a shaft-mounted fan blowing air into the motor structure or over its surface, as commonly utilized in AC motor design, is often ineffective in high-performance DC motors used in incremental motion applications, since the high power dissipation in the motor may take place at low shaft speeds where the shaft-mounted fan would be quite ineffective. Additionally, many applications involve motor operation in situations where the ambient air is contaminated with particles or chemicals which would cause operational problems if brought into contact with the motor.

It is therefore desirable to have a motor having a structure suitable for removal of heat from the armature to the exterior of the motor housing so that the air contamination would not cause difficulties. In the present invention, this problem is solved by the use of heat pipes to conduct heat from the motor interior to the outside of the motor housing. For example, a heat pipe installed in the armature shaft can be quite effective in removing heat from the armature, although, in some cases, the length of the armature and the restriction of the heat pipe size necessitated by the armature shaft diameter may preclude optimum heat removal for a specified motor design. Additionally, with the use of ceramic-type permanent magnets, the heat conduction from the rotor to the outside of the housing surface through the magnets is likely to be impaired due to the poor heat conductance qualities of the ferrites. This is especially true of the focussed magnet assemblies which generally are used in high-peformance motor applications. In such applications, the demand for heat removal is greater than other applications.

The poor heat conductance characteristics of the magnets coupled with the strong temperature degradation of the coefficient of magnetic flux density make it desirable to keep the magnet temperature from rising in order to optimize the motor output capacity.

An object of the present invention is to provide a DC motor with permanent magnet excitation wherein the heat conduction from the armature to the exterior of the motor housing is greatly enhanced, said motor being of simple design.

A further object of the invention is to provide a DC motor with the magnets held permanently in place against the inner surface of the motor housing by means in addition to adhesive means.

A still further object of the invention is a DC motor which has a construction which lends itself to inexpensive assembly.

These and other objects are achieved in a permanent magnet DC machine including a housing, an armature mounted for rotational motion in the housing, a plurality of bar magnets mounted on the inner surfaces of the housing, and a plurality of magnetically permeable pole pieces attached to the bar magnets to focus flux from the magnets upon the armature. The improvement of the invention comprises a plurality of wedges mounted between each of said magnets and pole pieces. The wedges are constructed and arranged to apply a longitudinal force to the side edges of the pole pieces and magnets when a force is applied to the wedge in an axial direction from the armature to maintain the magnets and pole pieces in a fixed predetermined alignment.

These and other features of the invention disclosed herein will be described in greater detail in the following detailed description.

BRIEF DESCRIPTION OF THE DRAWINGS

In the drawings, wherein similar reference numbers denote similar elements throughout several views thereof:

FIG. 1 is a cross-sectional view of an improved permanent magnet excited DC motor constructed according to the invention;

FIG. 2 is a cross-sectional view of a different embodiment of a permanent magnet DC motor constructued according to the invention;

FIG. 3 is a partial cross-sectional view of an improved permanent magnet DC motor constructed according to the invention;

FIG. 4 is a longitudinal partially cross-sectional view of the embodiment of the invention shown in cross-sectional form in FIG. 1;

FIG. 5 is an enlarged cross-section of one of the heat pipes shown in FIG. 4;

FIG. 6 is a cross-sectional view of the motor housing showing the fixture utilized to hold the wedges and magnets in place during curing; and FIG. 7 is a fragmentary cross-sectional view of a modified wedge and an alternative means for securing the wedge.

DETAILED DESCRIPTION

FIG. 1 shows the DC motor 10 which has a ferrous rectangular housing 11. The inner walls of the motor have magnet sections 12 bonded thereto with a suitable tough, crack-resistant adhesive such as an epoxy adhesive such as Uniset 161, which is manufactured by American Polymer Products Division of American Corporation, 25 Hartwell Avenue, Lexington, Mass. The magnets 12 are typically made from a ferrite material such as strontium ferrite, and polarized as shown in FIGS. 1 through 3. A suitable alloy for the magnets is magnet material M-8, as manufactured by TDK Corporation of America, 2906 West Peterson Avenue, Chicago, Ill. The coefficient of thermal expansion of the ferrite along the axis parallel to the inner wall of housing 11 is higher than that of the housing so it is necessary to have a bonding adhesive capable of yielding slightly as the temperature of the motor increases in operation.

A soft iron pole piece 14 is bonded to each of the ferrite magnets 12. The high permeability pole pieces 14 focus the flux from the magnets 12 into the air gap 18 which surrounds motor armature 20. As shown in FIG. 4, the armature 20 surrounds a concentric shaft 22 upon which is mounted a commutator 24. The surface of armature 20 is interrupted by a number of conventional longitudinal slots 26, two of which are shown in exaggerated form in FIG. 1, which carry normal armature windings. The armature windings are brought out to separate conductor bars 25 on commutator 24 and the commutator bars 25 are connected to the external terminals of the motor by conventional spring loaded brushes 27 as shown in FIG. 4. One or more additional brushes not specifically shown are also connected to commutator 24 to complete the armature circuits in a known manner.

If the motor 10 is operated at high temperature with the magnets 12 held in contact with the inner surface of housing 11 solely by the bonding adhesive, the mechanical forces between the armature and pole shoe assemblies tend to loosen the adhesive bond under extreme temperature conditions. In a typical assembly as illustrated in the figures, the air gap flux densities may exceed 11 K Gauss.

In order to overcome the above problem, it has been found desirable to utilize wedge shaped non-ferrous spacers or wedges 28. The spacers are inserted between the pole shoes at the time that the motor is being assembled. They are held in place during the curing process by the spring and plunger arrangement shown in FIG. 6. For each wedge 28, a plunger 30 is used to apply a force to put pressure on the pole piece wedges during assembly and the adhesive curing cycle. The distal end of a spring 32 urges each plunger 30 against its associated wedge 28. The plungers are restrained from lateral movement by a plunger guide 34, as shown in FIG. 6. The springs 32 are restrained at their proximal ends by an axially aligned member 35 enclosed within plunger guide 34.

The wedge 28 continues to act as a restraining force during motor operation, and provides additional support for the magnets and pole pieces in situations where the motor attains a high temperature either intentionally or accidentially which would cause a softening of the adhesive. The wedges 28, since they are in contact with the sides of the pole shoe are also effective in removing heat from the pole shoe especially when manufactured from materials having a high thermal conductivity such as aluminum.

For optimal performance of the wedge 28, the two sides which are in contact with pole pieces 14 should be non-parallel and convergent to a point outside of the motor case. Thus, as shown in FIG. 1, the angle 8 between the edge of pole piece 14 and its base is less than 45°. For optimum results, the angle $\theta$ should be between 35° and 43°, which is equivalent to an angle between the two non-parallel sides of wedge 25 ranging between 5° and 20°. The above angular ranges appear to provide good results in wedging the pole shoes in place.

In order to enhance the heat removing properties of the wedges 28, a heat pipe 36 can be inserted in each of the wedges 28 to enhance cooling of the motor. As shown in FIG. 5, the heat pipe is formed from an outer case 38 which has a fine wire mesh 40 around its inner wall and has a small quantity of a liquid such as water 39 enclosed therein under a reduced pressure. The heat pipe extracts heat from the wedges 28 in the following manner. The high temperature at the wedges 28 acts to evaporate liquid condensed at the evaporator end 41 of the heat pipe. The gas flows along the axis of the heat pipe to the other, cooler, end of the heat pipe where it is condensed to a liquid. The liquid then travels back to the evaporator section of the heat pipe by capillary action of the fine wire mesh 40 which acts as a wick. The entire process is continuous and acts without the necessity of any mechanically moving parts.

In the motor shown in FIG. 4, the heat pipes 36 have fins 42 in the condenser portion, while the evaporator portions are inserted in the wedges 28. In the embodiment shown in FIGS. 1 and 2, the motor shaft 22 has a heat pipe 36 installed therein to conduct heat away from the armature. In order to enhance the cooling, the motor shown in FIG. 4 has a housing 44 at the end where the finned heat pipes project. Cooling air is driven through the housing from an input 46 to an output port 48 by a fan 47 or other well-known means.

The modified structure shown in FIG. 2 provides for a reduction of the effects of armature reaction flux by using further magnets 50 between each of the adjacent pole pieces 14. The additional magnets 50, which may be manufactured from the same materials as magnets 12, serve to minimize leakage between adjacent pole shoes 14 and to minimize magnetic field distortion in the pole shoe and the magnet area due to armature reaction. It is also possible to have the magnets 50 fill substantially the entire area between the adjacent pole shoes at points along the axis of the motor other than the one at which the cross section of FIG. 2 is taken.

The embodiment shown in FIG. 3 utilizes the same wedges 28 shown in FIG. 1, but provides the cooling through the pole shoes 14 rather than the non-ferrous wedges 28.

The embodiment shown in FIG. 7 illustrates a modified wedge $28^1$ which is urged into firm engagement with adjacent pole pieces 14 by bolts 60, which are secured to the motor housing 11. The wedge can also be constructed with a substantial portion of its area in the space available between the ends of the bar magnets 12 to permit the heat pipe 36 to be moved to a point closer to the case 11 of the motor.

I claim:

1. In an electric motor comprising a housing, an armature mounted for rotational movement in said housing, a plurality of bar magnets mounted on inner surfaces of said housing, a plurality of magnetically permeable pole pieces attached to said magnet portions to focus flux from said magnets on said armature, the improvement comprising:
a plurality of wedge-shaped non-ferrous spacers mounted between each of said bar magnets and pole pieces, said spacers constructed and arranged to maintain said magnets and pole pieces in the proper alignment, at least one of said spacers including heat extraction means.

2. The invention of claim 1 wherein the angle between the non-parallel sides of said spacer between 5° and 20°.

3. The invention of claim 1 wherein said heat extraction means is a heat pipe.

4. The invention of claim 1 wherein said armature includes heat extraction means.

5. The invention of claim 4 wherein said heat extraction means is a heat pipe.

6. The invention of claim 1 wherein each of said pole pieces includes heat extraction means.

* * * * *